(12) United States Patent
Meisenzahl et al.

(10) Patent No.: US 7,423,668 B2
(45) Date of Patent: Sep. 9, 2008

(54) ON-CHIP BLOCK BALANCING STRUCTURE AND METHOD FOR MULTIPLE OUTPUT IMAGE SENSORS

(75) Inventors: Eric J. Meisenzahl, Ontario, NY (US); Edward T. Nelson, Pittsford, NY (US); John P. Shepherd, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 508 days.

(21) Appl. No.: 11/178,693

(22) Filed: Jul. 11, 2005

(65) Prior Publication Data

US 2007/0008413 A1   Jan. 11, 2007

(51) Int. Cl.
*H04N 17/00* (2006.01)
(52) U.S. Cl. .................... 348/187; 348/222.1
(58) Field of Classification Search ........... 348/187, 348/188, 180, 175, 176, 222.1, 241
See application file for complete search history.

(56) References Cited

U.S. PATENT DOCUMENTS

| | | | | |
|---|---|---|---|---|
| 4,035,629 | A * | 7/1977 | Lampe et al. | 702/193 |
| 5,285,286 | A * | 2/1994 | Kannegundla | 348/187 |
| 5,406,329 | A * | 4/1995 | Kashimura et al. | 348/175 |
| 6,072,603 | A * | 6/2000 | Parks | 358/504 |
| 7,215,361 | B2 * | 5/2007 | Duesman et al. | 348/187 |

* cited by examiner

*Primary Examiner*—M. Lee
(74) *Attorney, Agent, or Firm*—Peyton C. Watkins

(57) ABSTRACT

A method for calibrating an image sensor having multiple outputs, the method includes the steps of capturing an image on the image sensor, injecting one or more substantially identical pairs of signals into corresponding portions of the captured image, reading out the captured image with the injected signals into two or more outputs, and comparing two substantially identical signals from corresponding portions of the image, which comparison is used for calibrating the image.

26 Claims, 3 Drawing Sheets

ON-CHIP BLOCK BALANCING STRUCTURE AND METHOD FOR MULTIPLE OUTPUT IMAGE SENSORS

FIELD OF THE INVENTION

The invention relates generally to the field of image sensors having multiple outputs. More specifically, the invention relates to image sensors having an injection structure which produces a signal for calibrating multiple outputs.

BACKGROUND OF THE INVENTION

Image sensors, used in digital cameras, are optionally designed with multiple outputs to increase frame rate. However, multiple outputs introduce non-uniformities due to the mismatches in performance of the separate outputs and associated off-chip signal processing hardware. It has been practiced (for example U.S. Pat. No. 6,072,603) that the mismatches in the output performance can be balanced by the use of known test targets in conjunction with one or more sets of measured correlation values. In these cases, the calibration is static in that it is performed before the image sensor is put into general use and therefore becomes less accurate as environmental or operating conditions change. As these conditions change, the user must re-calibrate the system by generating a new set of correlation values using the test target setup.

Consequently, a need exists for an image sensor which permits real-time calibration.

SUMMARY OF THE INVENTION

The present invention is directed to overcoming one or more of the problems set forth above. Briefly summarized, according to one aspect of the present invention, the calibration of a multiple output image sensor can be balanced by means of an on-chip electrical injection structure. The electrical injection structure is a means for inputting predetermined signals into the image sensor that are subsequently processed through the device and measured at the outputs. The implementation of this structure enables each captured image to contain the information necessary to balance the output signals. This eliminates the need for periodic off-line calibration as camera characteristics drift.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages.

Image mismatches associated from multiple output image sensors can be balanced by means of an on-chip electrical injection test structure without the need of special test setups or test targets.

Each image captured during normal picture taking can contain the calibration data necessary to balance the outputs as camera environments and operating conditions change.

The number of calibration points can be large and span the entire dynamic range of the device. For CCD-type image sensors this is only limited by the number of columns (or rows) in each sub-array providing a more accurate relationship between outputs.

The structure supports injecting on multiple rows (or columns) during readout enabling averaging of calibration points leading to improved statistical accuracy.

DETAILED DESCRIPTION OF THE INVENTION

Before describing the invention in detail, it is noted that the preferred embodiment illustrates a true two-phase CCD image sensor, but those skilled in the art will recognize that various image sensor architectures can be used. Furthermore, transistors of this embodiment are depicted as of the N-channel type, although it is understood that P-channel types could also be used.

Figure 1:
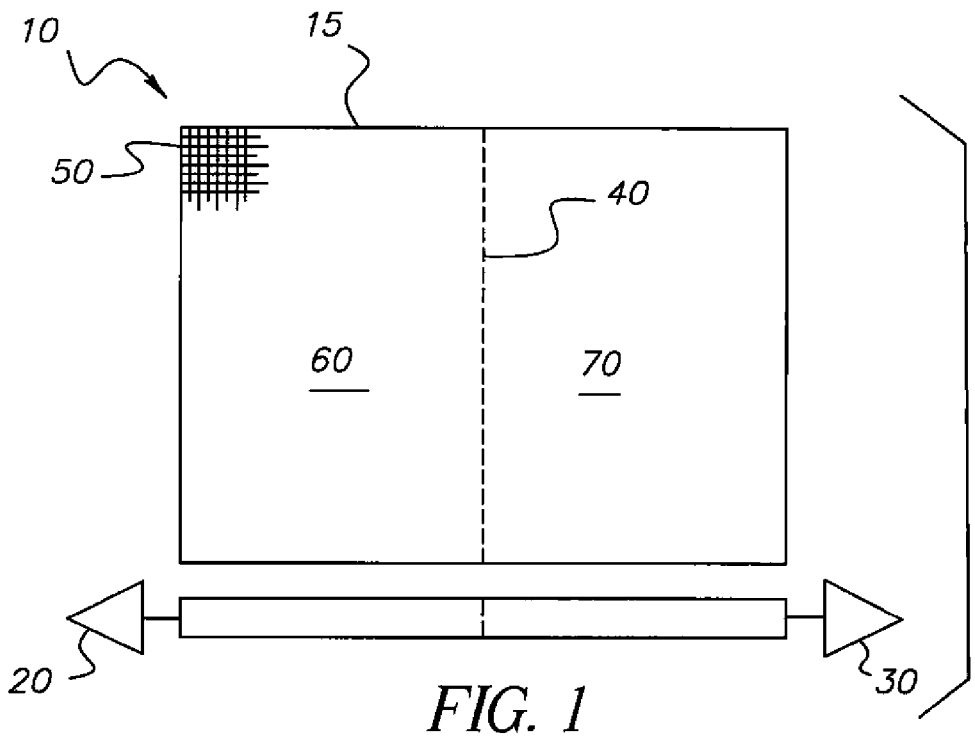
FIG. 1 is a top view of an image sensor of the present invention.

FIG. 1 is an example of an image sensor 10 configured into an array of pixels 15 and having two outputs 20 and 30. The image sensor 10 is configured in such a way for pixels on the left hand side of the dashed line 40 to be routed to output 20 and pixels on the right hand side of the dashed line 40 to be routed to output 30. The dashed line 40 represents the location of a seam where output mismatches would be most noticeable. An injection structure 50 is placed across the seam or boundary 40 of two subarrays of pixels 60 and 70. The injection structure 50 typically includes a row of pixels added to the array of pixels 15, and the injection structure 50 spans and crosses the seam as will be described in detail herein below.

Figure 2A:
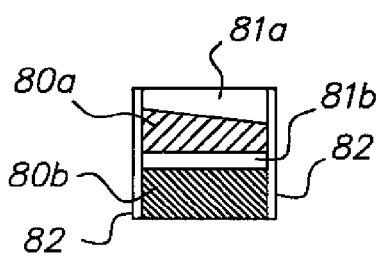
FIG. 2 is detailed view of the injection structure region at the top of the image sensor of FIG. 1.
Figure 2B:
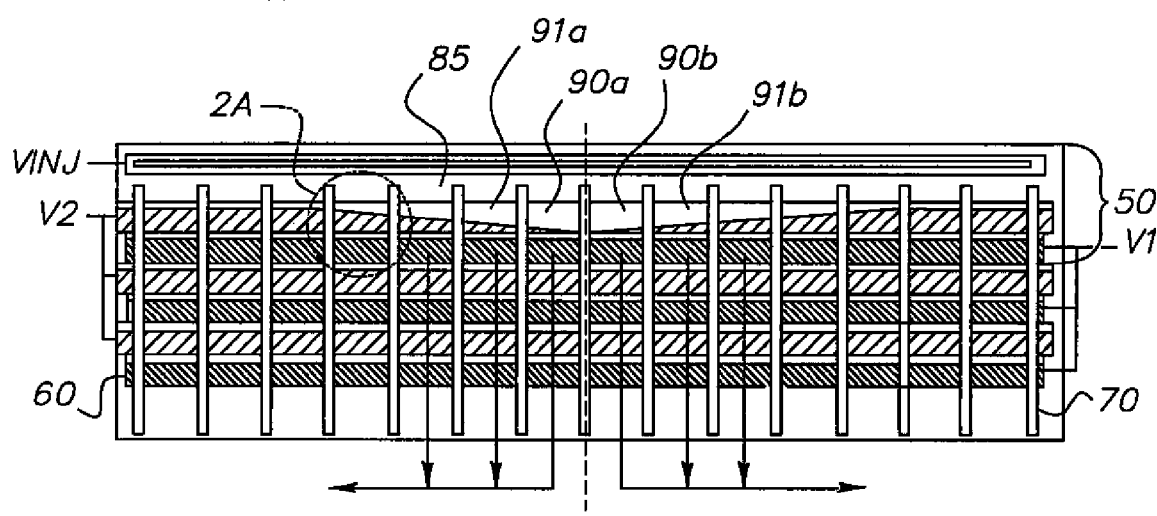

In the preferred embodiment of FIG. 2, the pixel is formed by defining (a) storage regions 80a, 80b for holding collected signal either by incident light and/or by the injection diode VINJ; (b) barrier regions 81a, 81b for separating storage regions in the vertical direction; (c) isolation regions 82 for separating pixels in the horizontal direction; and (d) one or more gate electrodes V1, V2 for controlling the movement of signal within and between the pixels. The injection structure 50 also consists of a reversed biased injection diode VINJ that is coupled to the pixel barrier region 81a by means of a buried channel 85. The amount of signal a pixel can hold is dependent on the size of the storage regions 80a, 80b. The storage regions 80a of the injection structure 50 are modulated such that pixels 90a and 90b closest to the seam 40 have little or no signal capacity. The storage region 80a of pixels within the injection structure 50 increase in size as it extends away from the seam 40. Thus pixel pairs 90a and 90b should have substantially identical or identical signals, pixels pairs 91a and 91b should have substantially identical or identical signals which are slightly larger in magnitude than the pixel pairs 90a and 90b and etc. It is desirable to inject a variety of signal sizes for each injection event in order to better represent the entire signal range of the image sensor outputs.

Figure 3A:
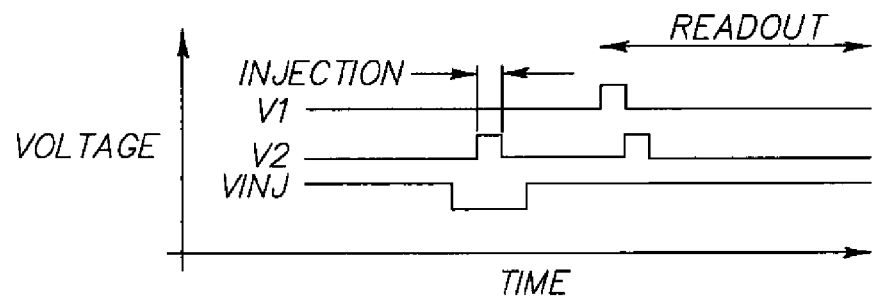
FIG. 3a is a preferred timing diagram for operating the injection structure of FIG. 2.
Figure 3B:
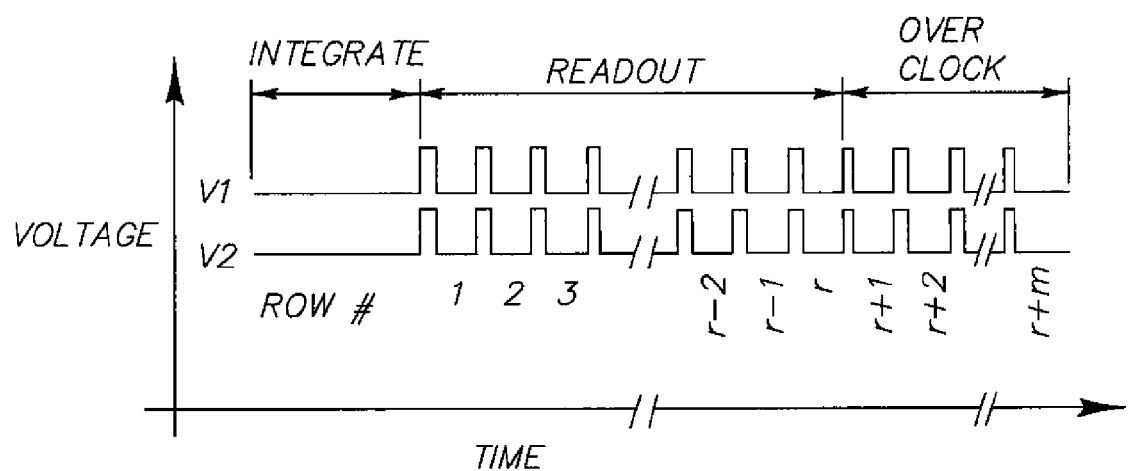
FIG. 3b is a preferred timing diagram for clocking beyond the physical dimensions of the image sensor.

Referring to FIG. 3a, signals are preferably injected into the injection structure by clocking the injection diode VINJ from a high voltage to a low voltage while the gate electrodes V1,V2 are clocked in such a way, dependent on architecture, as to accept the signal into the array. Referring to FIG. 3b, there is shown a timing diagram for a two phase CCD illustrating a means for clocking beyond the physical dimension of the image sensor. A typical cycle includes an integration period and an image readout period. The present invention adds the over-clock region that provides additional rows or lines of nominally empty pixels that can be used to carry injected signal for the purpose of averaging. It is noted that, although a timing diagram for a two phase CCD is shown, the invention may be implemented on any architecture with the timing altered accordingly.

Figure 4:
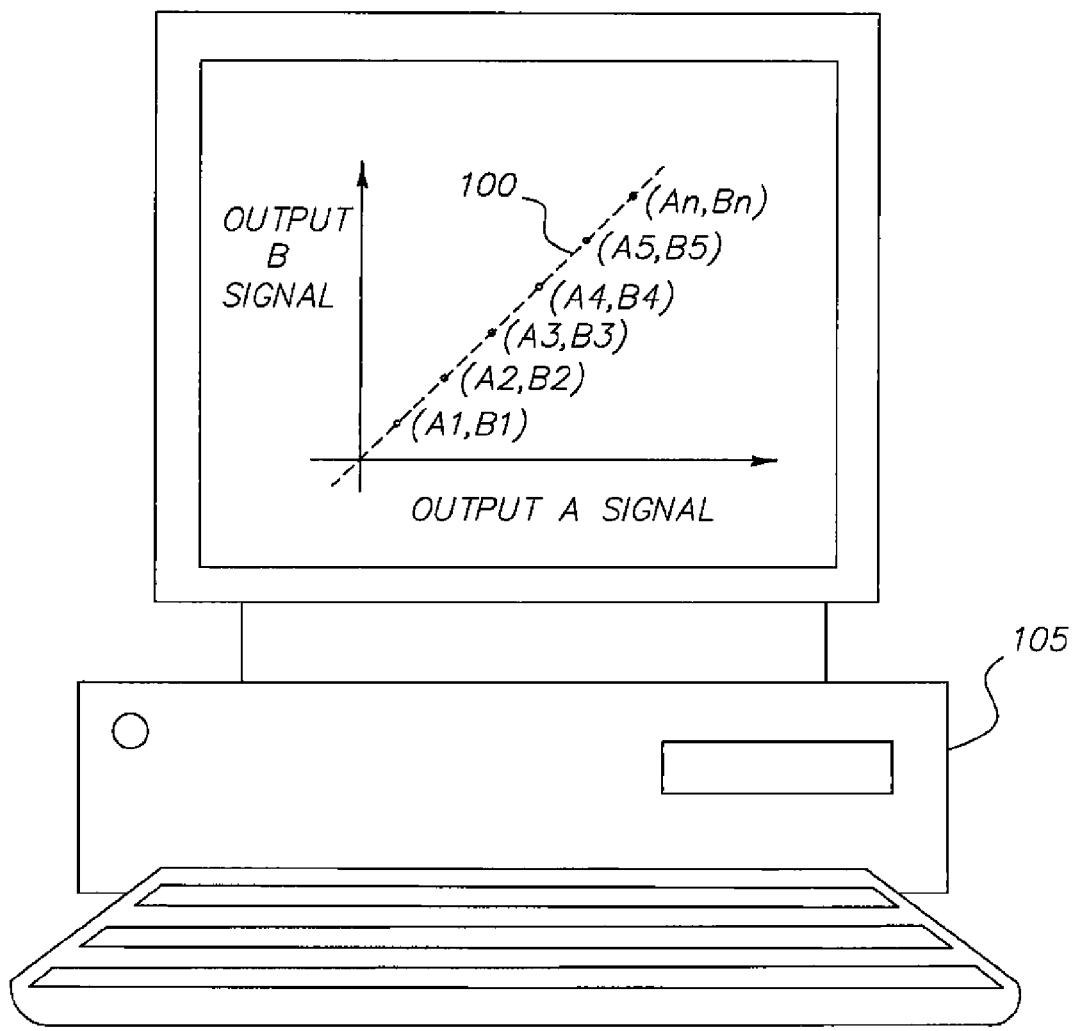
FIG. 4 is a CPU containing a comparison of signal pairs relating two different outputs.

FIG. 4 is a CPU 105 that processes or compares the signal values of each pixel pair 90a and 90b, 91a and 91b, and etc. in a plot. Once the pairs of signals from the outputs 20, 30 have been collected, they can be compared against each other as shown in FIG. 4. Using various curve fitting techniques, such as 100, the outputs may be balanced by using the curve coefficients at virtually any signal level. By increasing the number of pairs of signals, noise is statistically removed. Although the preferred embodiment illustrates a CPU 105, it is noted that the CPU 105 comparison may be implemented in hardware or by means of a software program on any suitable electronic device, such as a camera or computer.

In summary, there is the image sensor having multiple outputs. An image is captured on the image sensor. One or more substantially identical pairs or groups of pairs of signals, each pair preferably having different magnitude signals, are injected into corresponding portions of the captured image. The captured image is read out with the injected signals into the two or more outputs. Two substantially identical signals from corresponding portions of the image are compared which is used for calibrating the image.

The preferred method further includes clocking the image sensor beyond a physical dimension of the image sensor to obtain improved measurement accuracy. The image is clocked beyond the captured image pixels so that multiple and substantially identical or identical sets of injected signals are read out appropriately. Still further, rather than inject the signals into a single row (or column) at the end of the array, it is further beneficial in Charge-Coupled Device (CCD) image sensors to inject on multiple rows (or columns) following an image capture while the image data is being read out. In this case, the image array must be clocked an additional number of counts in order to collect the additional rows (or columns) of signals. The resulting, artificially larger, image now contains repeating rows (or columns) of calibration data that can be averaged within columns (or rows) for generating more precise output balancing curve coefficients.

Figure 5:
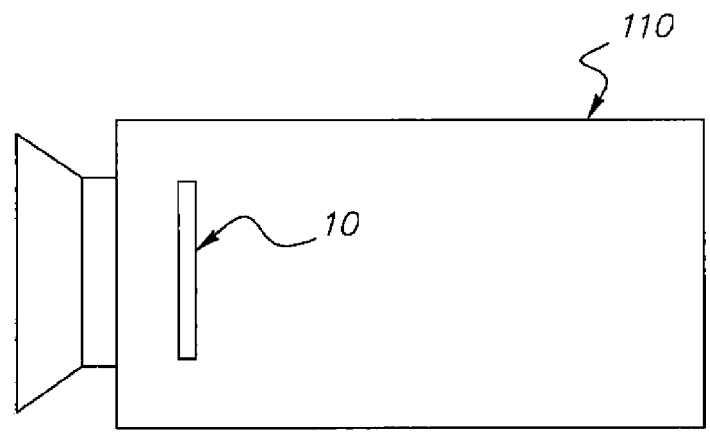
FIG. 5 is a side view of a digital camera having the image sensor of FIG. 1 for illustrating a typical commercial embodiment.

Referring to FIG. 5, there is shown a side view of a digital camera 110 having the image sensor 10 with the multiple outputs 20 and 30 of the present invention for illustrating a typical commercial embodiment. The image sensor 10 in the camera 110 is calibrated as described hereinabove.

The invention has been described with reference to a preferred embodiment. However, it will be appreciated that variations and modifications can be effected by a person of ordinary skill in the art without departing from the scope of the invention.

PARTS LIST 10 image sensor
15 pixel array
20 output
30 output
40 dashed line (seam or boundary)
50 injection structure
60 pixel subarray
70 pixel subarray
80a pixel storage region
80b pixel storage region
81 pixel barrier regions
82 pixel isolation regions
85 buried channel region
90a pixel pair
90b pixel pair
91a pixel pair
91b pixel pair
100 curve fitting technique
105 CPU
110 digital camera
VINJ injection diode
V1 gate electrode
V2 gate electrode

The invention claimed is:

1. A method for calibrating an image sensor having multiple outputs, the method comprising the steps of:
   (a) capturing an image on the image sensor;
   (b) injecting one or more substantially identical pairs of signals into corresponding portions of the captured image;
   (c) reading out the captured image with the injected signals into two or more outputs; and
   (d) comparing two substantially identical signals from corresponding portions of the image, which comparison is used for calibrating the image.

2. The method as in claim 1 further comprising the step of injecting a plurality of substantially identical pairs of signals with each pair or groups of pairs having different magnitude signals.

3. The method as in claim 1 further comprising the step of clocking the image sensor beyond a physical dimension of the image sensor to obtain improved measurement accuracy.

4. The method as in claim 2 further comprising the step of clocking the image sensor beyond a physical dimension of the image sensor to obtain improved measurement accuracy.

5. An imaging system comprising:
   (a) an image sensor having a plurality of pixels comprising:
      (i) an input for injecting one or more substantially identical pairs of signals into corresponding portions of an image captured on the image sensor;
      (ii) a horizontal readout register for reading out the captured image with the injected signals;
   (b) two or more outputs wherein each output is associated with each horizontal readout register; and
   (c) a comparator for comparing two substantially identical signals from corresponding portions of the image which is used for calibrating the image.

6. The image sensor as in claim 5, wherein the input injects a plurality of substantially identical pairs of signals with each pair or groups of pairs having different magnitude signals.

7. The image sensor as in claim 5, wherein the corresponding portions include two or more distinct subarrays of the pixels that are spatially oriented in a predetermined configuration and each subarray is connected to a different output.

8. The image sensor as in claim 5, wherein a pixel comprises one or more storage regions that contains signals corresponding to the injected signal and/or an amount of light.

9. The image sensor as in claim 8, wherein a pixel further comprises one or more barrier regions for vertically isolating the storage regions from adjacent pixels.

10. The image sensor as in claim 9, wherein a pixel further comprises an isolation region for horizontally isolating the storage and barrier regions from adjacent pixels.

11. The image sensor as in claim 10, wherein a pixel further comprises one or more gate electrodes for controlling transfer of signals from one pixel to an adjacent pixel.

12. The image sensor as in claim 5 further comprising an injection diode for electrically connecting to a predetermined row or column of pixels.

13. The image sensor as in claim 12 further comprising a buried channel for electrically connecting the injection diode to the predetermined row or column of pixels.

14. The image sensor as in claim 9, wherein the barrier region is modified at specific pixels at the predetermined row or column of pixels such that a size of the storage region is modulated.

15. The image sensor as in claim 6, wherein the plurality of substantially identical pairs or groups of pairs of signals having different magnitude signals are spatially positioned in a symmetrical configuration within each subarray.

16. A camera comprising:
an imaging system comprising:
(a) an image sensor having a plurality of pixels comprising:
   (i) an input for injecting one or more substantially identical pairs of signals into corresponding portions of an image captured on the image sensor;
   (ii) a horizontal readout register for reading out the captured image with the injected signals;
(b) two or more outputs wherein each output is associated with each horizontal readout register; and
(c) a comparator for comparing two substantially identical signals from corresponding portions of the image which is used for calibrating the image.

17. The camera as in claim 16, wherein the input injects a plurality of substantially identical pairs of signals with each pair or groups of pairs having different magnitude signals.

18. The camera as in claim 16, wherein the corresponding portions include two or more distinct subarrays of the pixels that are spatially oriented in a predetermined configuration and each subarray is connected to a different output.

19. The camera as in claim 16, wherein a pixel comprises one or more storage regions that contains signals corresponding to the injected signal and/or an amount of light.

20. The camera as in claim 19, wherein a pixel further comprises one or more barrier regions for vertically isolating the storage regions from adjacent pixels.

21. The camera as in claim 20, wherein a pixel further comprises an isolation region for horizontally isolating the storage and barrier regions from adjacent pixels.

22. The camera as in claim 21, wherein a pixel further comprises one or more gate electrodes for controlling transfer of signals from one pixel to an adjacent pixel.

23. The camera as in claim 16 further comprising an injection diode for electrically connecting to a predetermined row or column of pixels.

24. The camera as in claim 23 further comprising a buried channel for electrically connecting the injection diode to the predetermined row or column of pixels.

25. The camera as in claim 20, wherein the barrier region is modified at specific pixels at the predetermined row or column of pixels such that a size of the storage region is modulated.

26. The camera as in claim 18, wherein the plurality of substantially identical pairs or groups of pairs of signals having different magnitude signals are spatially positioned in a symmetrical configuration within each subarray.

* * * * *